US012468065B2

(12) United States Patent
Liu et al.

(10) Patent No.: US 12,468,065 B2
(45) Date of Patent: Nov. 11, 2025

(54) MEASUREMENT SYSTEM AND MEASUREMENT METHOD FOR MEASURING DETECTION PERFORMANCE OF HUMAN BODY SAFETY INSPECTION EQUIPMENT

(71) Applicant: The Third Research Institute of Ministry of Public Security, Shanghai (CN)

(72) Inventors: Caixia Liu, Shanghai (CN); Fangyi Xie, Shanghai (CN)

(73) Assignee: THE THIRD RESEARCH INSTITUTE OF MINISTRY OF PUBLIC SECURITY, Shanghai (CN)

( * ) Notice: Subject to any disclaimer, the term of this patent is extended or adjusted under 35 U.S.C. 154(b) by 246 days.

(21) Appl. No.: 18/248,233

(22) PCT Filed: Jan. 28, 2021

(86) PCT No.: PCT/CN2021/074025
§ 371 (c)(1),
(2) Date: Apr. 6, 2023

(87) PCT Pub. No.: WO2022/083023
PCT Pub. Date: Apr. 28, 2022

(65) Prior Publication Data
US 2023/0375743 A1   Nov. 23, 2023

(30) Foreign Application Priority Data

Oct. 23, 2020   (CN) .......................... 202011148575.X
Oct. 23, 2020   (CN) .......................... 202022396706.8

(51) Int. Cl.
G01V 5/22   (2024.01)
G01V 13/00   (2006.01)

(52) U.S. Cl.
CPC ................ *G01V 13/00* (2013.01); *G01V 5/22* (2024.01)

(58) Field of Classification Search
CPC ............. G01V 13/00; G01V 5/22; G01V 8/00
See application file for complete search history.

(56) References Cited

FOREIGN PATENT DOCUMENTS

CN        108776266 A   *   11/2018   .........   G01R 29/0821

OTHER PUBLICATIONS

Translation of CN108776266A (Year: 2018).*
(Continued)

*Primary Examiner* — David P Porta
*Assistant Examiner* — Mamadou Faye
(74) *Attorney, Agent, or Firm* — John P. White

(57) ABSTRACT

The present invention discloses a test system and a test method for testing the detection performance of a human body safety inspection apparatus, and the present solution includes a moving track assembly, a fixed tray assembly, a human body model assembly, a control assembly, a test card assembly and a test article. At the same time, the temperature of different parts on a human body model is controlled to vary within 36° C. to 45° C. to simulate the temperature of different parts of a real human body, while controlling the human body model carrying a test card and/or test article to rotate and adjust height so that the human body model rotates at different angles to face the human body safety inspection apparatus to be tested, and the human body model is driven to move back and forth repeatedly at a set speed to an appropriate position in a region under inspection to simulate a real person in a detection state in an actual application scenario, thus completing the automatic laboratory testing of the human body safety inspection apparatus. The present solution realizes the automatic laboratory detection of the human body safety inspection apparatus, thus (Continued)

greatly reducing the labor cost, and the data accuracy is effectively improved, thus effectively increasing the testing efficiency.

15 Claims, 9 Drawing Sheets

(56) References Cited

OTHER PUBLICATIONS

N. Palka "THz Screening for Civil and Military Security" THz and Security Applications, NATO Science for Peace and Security Series B: Physics and Biophysics, @Springer Science. (Year: 2014).*

* cited by examiner

MEASUREMENT SYSTEM AND MEASUREMENT METHOD FOR MEASURING DETECTION PERFORMANCE OF HUMAN BODY SAFETY INSPECTION EQUIPMENT

CROSS-REFERENCE TO RELATED APPLICATIONS

This application is a § 371 national stage of PCT International Application No. PCT/CN2021/074025, filed Jan. 28, 2021, claiming priority of Chinese Patent Application No. 202011148575.X, filed Oct. 23, 2020, and Chinese Patent Application No. 202022396706.8, filed Oct. 23, 2020, the contents of each of which are hereby incorporated by reference in their entirety.

TECHNICAL FIELD

The present disclosure relates to an apparatus test technology, and particularly relates to a test technology for the detection performance of detection apparatuses related to human body safety inspection.

BACKGROUND

At present, with the increasingly severe situation at home and abroad, in order to prevent persons from carrying drugs, explosives, flammable and explosive liquids, solid dangerous goods, firearms, knives and other contraband concealed threat to the public safety, the security protection technology for human body safety inspection is becoming increasingly important. For the continuously strengthened access security protection in government agencies, consulates, troops, banks, airports and other public places and confidential places, the demand of the market for human body safety inspection apparatuses is increasing.

In the producing, manufacturing and using process of the human body safety inspection apparatus, in order to test the relevant detection function of the apparatus, it is necessary for persons to carry contraband to repeatedly pass through the detection samples. However, the speed and trajectory of movement of the persons cannot be quickly and quantitatively determined accurately, and the human interference factor is greater for the persons under test. Furthermore, in order to test the performance of the human body safety inspection apparatus, such as the line-to-line resolution and the space resolution, it is necessary to repeatedly add test cards corresponding to different performance indexes in a real human body, which is not easy to operate.

More importantly, in order to test the detectable rate, missing alarm rate, false alarm rate, etc. of the human body safety inspection apparatus, the persons are required to replace and carry different test articles on different parts of the human body and move back and forth to repeat the test in order to increase the number of tests to more than a hundred. The stability of test article is poor, the labor cost is high, and the time consumption is high.

In existing test methods, the above function and performance tests are usually carried out manually and separately. A traditional operation method results in a discontinuous, unsynchronized, less controllable and inefficient test, thus significantly limiting the productivity of the human body safety inspection apparatus.

SUMMARY

A new test solution for the detection performance of detection apparatuses related to human body safety inspection is required to address the problems when the detection performance of the detection apparatuses related to human body safety inspection is tested on the basis of a manual operation method.

To this end, the present disclosure aims to provide a test system for testing the detection performance of a human body safety inspection apparatus and provide a test method for testing the detection performance of a human body safety inspection apparatus on the basis of the test system. The solution is capable of supporting both the function testing and performance index testing related to the human body safety inspection apparatus at the same time, automatically controlling the testing process with high controllability and high repeatability, and greatly improving the testing efficiency.

In order to achieve the above purpose, the test system for testing the detection performance of a human body safety inspection apparatus provided by the present disclosure includes a moving track assembly, a fixed tray assembly, a human body model assembly, a control assembly, a test card assembly and a test article;

the human body model assembly being used for simulating a real human body under test, including the body shape, clothing and body temperature; the human body model assembly being mounted on the fixed tray assembly and being capable of moving up and down or/and rotating under driving of the fixed tray assembly to simulate a real person in a detection state of a realistic application scenario; the fixed tray assembly being movably mounted on the moving track assembly;

the test card assembly and the test article being used for testing the detection function and performance of the human body safety inspection apparatus, and able to be additionally mounted in test regions on the human body model assembly;

the control assembly controlling the moving track assembly, the fixed tray assembly and the human body model assembly to form a test environment; the control assembly controlling the heat generating state of the human body model assembly to simulate a real human body temperature; the control assembly controlling the fixed tray assembly to drive the human body model assembly to move up and down and to perform a 360-degree rotation to face the human body safety inspection apparatus to be tested at different angles; the control assembly controlling the moving track assembly to drive the human body model assembly to move back and forth repeatedly at a set speed to an appropriate position in a region under inspection.

Further, the moving track assembly mainly includes a guide rail unit and a moving bearing device, the guide rail unit constructs a moving path, and the moving bearing device is used for bearing the fixed tray assembly, mounted on the guide rail unit, and controlled by the control assembly to move along the guide rail unit.

Further, the moving bearing device is a rail tackle or a moving table, the rail tackle includes a motor pulley, a moving wheel combination and an anti-derailment positioner.

Further, the guide rail unit includes a curved guide rail or/and a straight guide rail, the curved guide rail includes a monorail structure or/and a double-rail structure, and the straight guide rail includes a monorail structure or/and a double-rail structure.

Further, guide rails of the double-rail structure can be folded singly or/and can be locked and seamlessly spliced; the guide rails of the double-rail structure are telescopic to adjust the gauge, and is used for being laid in a channel or on a platform under inspection of the human body safety inspection apparatus under test.

Further, the guide rail unit forms straight, elliptical, sectorial, circular and other guide rail movement routes by a combination of single folding and seamless splicing between straight double rails and curved double rails.

Further, the fixed tray assembly includes a tray portion and a plurality of length-adjustable fixing brackets, the tray portion being mounted on the moving track assembly and controlled by the control assembly to perform a 360-degree rotation; the plurality of length-adjustable fixing brackets being mounted on the tray portion for being fixedly connected to the human body model assembly, and the plurality of length-adjustable fixing brackets being controlled by the control assembly for length adjustment.

Further, the tray portion is made of an ABS resin material and selected to be of an appropriate thickness to achieve interference with electromagnetic wave detection by metal bracket components of the rail tackle to avoid false alarms; where the selected material and thickness have a certain shielding effect on terahertz and millimeter wave bands to avoid that metal affects the detection range and detection results.

Further, the human body model assembly includes a human body model prop, a body model, a test clothing and a heat generating device;

the human body model is simulated into an adult human body shape, and the body model is made of a conventional high-density polyethylene material with a thickness of not less than 55 mm; a male human body model, a female human body model and a child human body model are set in equal proportions according to the conventional human body form; the internal structure of the model is of a hollow design, facilitating mounting the built-in heat generating device; the torso of the model is movable and the surface is provided with fixing fasteners to facilitate putting on or taking off different styles of clothing;

the test clothing is worn on the human body model for simulating the degree of penetration interference of the clothing with electromagnetic waves under real conditions; and the heat generating device is additionally mounted on typical parts of the human body model associated with the test region and is controlled by the control assembly so that the temperature of different parts of the human body model varies from 36° C. to 45° C., for simulating the temperature of different parts of the real human body and the variation with the surrounding environment and for meeting the relevant radiation intensity requirements for terahertz waves and millimeter waves.

Further, the heat generating device includes a heating plate made of a wave-absorbing material.

Further, the control assembly includes an electronic control module and a temperature control module, the electronic control module controls the moving track assembly and the fixed tray assembly to control and adjust the state of the human body model assembly moving back and forth, and to control and adjust the rotation angle and height of the human body model assembly; the temperature control module controls the human body model assembly to control and adjust the temperature of different parts of the human body model to vary within a range of 36° C. to 45° C.

Further, the test card assembly includes one or more of a (body) line-to-line resolution test card, a (body) space resolution test card, an air background material detectability test card, and a human body background material detectability test card.

Further, for a human body safety inspection apparatus based on the millimeter wave technology,
the corresponding line-to-line resolution test card and space resolution test card both have a specification size of 300 mm×300 mm with an acrylic plate of a 2 mm thickness as a substrate and a single or line pair of metal strips attached to the surface;
the specifications of the single metal strip used for the line-to-line resolution test card include a strip length of 50 mm and strip widths of 0.5 mm, 1 mm, 2 mm, 3 mm, 4 mm and 5 mm; the layout thereof is in a rectangle with sine curves arranged at equal intervals, located in the upper right region of the test card; the layout thereof is in rectangles with straight lines arranged at equal intervals in three directions of the transverse direction, the longitudinal direction and inclination at an angle of 45 degrees, located in the other three regions of the test card, with the rectangles equidistant from the corners;
the specifications of the line pair of metal strips used for the space resolution test card include a strip length of 50 mm and strip widths of 10 mm, 9 mm, 8 mm, 7 mm, 6 mm, 5 mm, 4.5 mm, 4 mm, 3.5 mm, 3 mm, 2.5 mm, 2 mm, 1.5 mm and 1 mm; the layout thereof is in rectangles with 4 straight lines of each size arranged at equal line width and equal intervals in a total of three directions on the test card, the transverse direction, the longitudinal direction and inclination at an angle of 45 or 315 degrees, distributed at equal intervals.

Further, for a human body safety inspection apparatus based on the terahertz technology, the corresponding line-to-line resolution test card and space resolution test card both have a specification size of 300 mm×300 mm with an acrylic plate of a 3 mm thickness as a substrate, and a single or line pair of metal strips attached to the surface;
the specifications of the single metal strip used for the line-to-line resolution test card include a strip length of 100 mm and strip widths of 5 mm, 10 mm, 15 mm, 20 mm, 25 mm and 30 mm; the specifications of the line pair of metal strips used for the space resolution test card include a strip length of 100 mm and strip widths of 50 mm, 45 mm, 35 mm, 25 mm and 20 mm; the layout thereof is consistent with the layout based on the millimeter wave technology, and the number is adjusted and selected according to the size.

Further, for a human body safety inspection apparatus based on the microdose X-ray technology, the corresponding test cards include a body line-to-line resolution test card, a body space resolution test card, an air background material detectability test card and a human body background material detectability test card, where the specification and layout of the test card are set according to standards.

Further, the test article is selected to be set in the corresponding test region on the human body model according to the test needs and can be attached to different parts of the human body model such as the upper arms, the forearms, the forebreast, the back, the thighs, the lower legs, the torso side, the groins, the buttocks, the armpits and the underbody for testing the performance of the human body safety inspection apparatus in terms of the detectable rate or passing rate, missing alarm rate, false alarm rate and redundant false alarm index.

Further, the test article includes one or more of a non-metallic article, a metallic article, a knife, and a liquid article in a plastic bottle of not less than 100 ml of water.

In order to achieve the above purpose, the test method for testing the detection performance of a human body safety inspection apparatus provided by the present disclosure controls the temperature of different parts on a human body model to vary within 36° C. to 45° C. to simulate the temperature of different parts of a real human body, while controlling the human body model carrying a test card and/or test article to rotate and adjust height so that the human body model rotates at different angles to face the human body safety inspection apparatus to be tested, and the human body model is driven to move back and forth repeatedly at a set speed to an appropriate position in a region under inspection to simulate a real person in a detection state in an actual application scenario, thus matching the inspection work state of the human body safety inspection apparatus and completing the automatic laboratory testing of the human body safety inspection apparatus.

Further, the test method includes the following steps:
(1) initializing the test system according to user's operation;
(2) determining the type of technical principles used for a sample according to the product instruction manual for the sample, locking the human body model onto a fixed tray, then mounting a fixed tray assembly on a moving bearing device in a moving track assembly, and adjusting the height and rotation angle of the human body model; and then laying guide rails in a region under inspection of the human body safety inspection apparatus to be tested, adjusting the overall width of moving rails according to the width of a passing channel, and placing the moving bearing device on the guide rail;
(3) initializing the temperature of the human body model by means of a control accessory in conjunction with the application of the technology used for the apparatus under test, and setting the temperature of the various parts of the human body model according to the testing requirements;
(4) setting the movement speed, the number of movements and the movement mode of the human body model on the guide rail according to the test requirement by means of the control accessory according to the test content of a test item;
(5) according to the function and performance index requirements under test, if it is a function test, proceeding to step (6); if it is a performance test using a test card, proceeding to step (7), and if it is a performance test using a test article, proceeding to step (8);
(6) performing function testing of scanning imaging and automatic detection of articles in accordance with the function technology requirements related to detection of the human body safety inspection apparatus; performing operation in accordance with the product's operation instruction to determine whether the apparatus meets the function technology requirements;
(7) according to the performance index requirements related to the human body safety inspection apparatus, using different test cards for testing (body) line-to-line resolution, (body) space resolution, human body background detectability, space background detectability and other performance indexes; and
(8) according to the performance index requirements related to the human body safety inspection apparatus, testing the performance indexes of the detectable rate, missing alarm rate, false alarm rate, redundant false alarm index and passing rate through operations such as setting the movement mode of a rail tackle by the control assembly, changing the human body model wearing different test clothing, changing the test article and the test region in which the test article is placed on the human body model.

The solution of the test system provided by the present disclosure is capable of supporting both the function testing and performance index testing related to the human body safety inspection apparatus at the same time, automatically controlling the testing process with high controllability and high repeatability, and greatly improving the testing efficiency, so that the productivity of the human body safety inspection apparatus is improved, with a simple structure, a method easy to implement and convenient operation.

The test method provided by the present disclosure makes the human body model with different rotation angles simulate the real person entering the inspection work state of the human body safety inspection apparatus according to the cross-testing situation with or without carrying the test article and the test card by a moving rail, which realizes the automatic laboratory detection of the human body safety inspection apparatus, thus greatly reducing the labor cost, with high controllability of test parameter conditions and high repeatability, and by diverse combinations of test methods, the number of tests is greatly increased and the data accuracy is effectively improved, thus effectively increasing the testing efficiency.

BRIEF DESCRIPTION OF THE DRAWINGS

The present disclosure will be further described below in combination with the accompanying drawings and the embodiments.

DETAILED DESCRIPTION

In order to make the technical means, creative features, achieved purpose and efficacy realized by the present disclosure easy to understand, the present disclosure is further illustrated below in combination with specific illustrations.

The solution of the present disclosure completes the automatic laboratory testing of a human body safety inspection apparatus by simulating the state of a real person in a detection state in the actual application scenario, and then thereby matching the inspection work state of the human body safety inspection apparatus.

Figure 1:
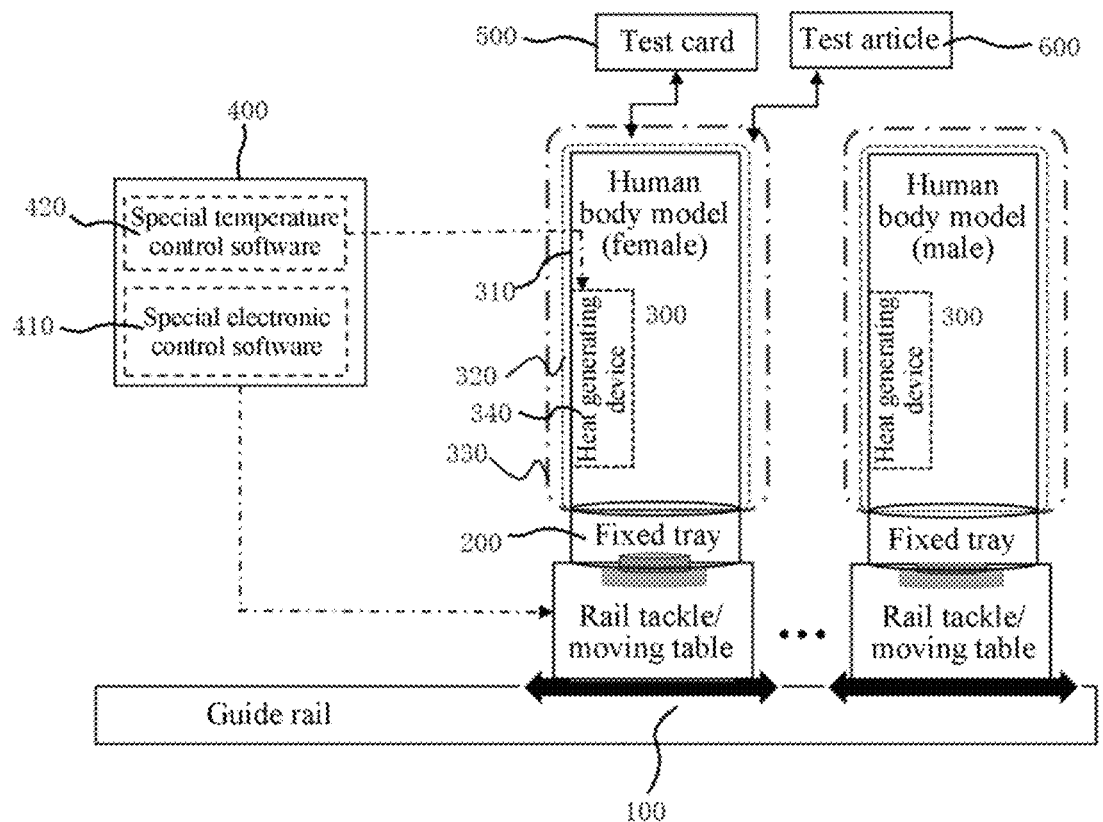
FIG. 1 is a schematic view of the principle for forming a test system for testing the detection performance of a human body safety inspection apparatus in an example of the present disclosure.

Refer to what is shown in FIG. 1, FIG. 1 shows an example of the principle for forming a test system for testing the detection performance of a human body safety inspection apparatus given in the present solution.

Figure 2:
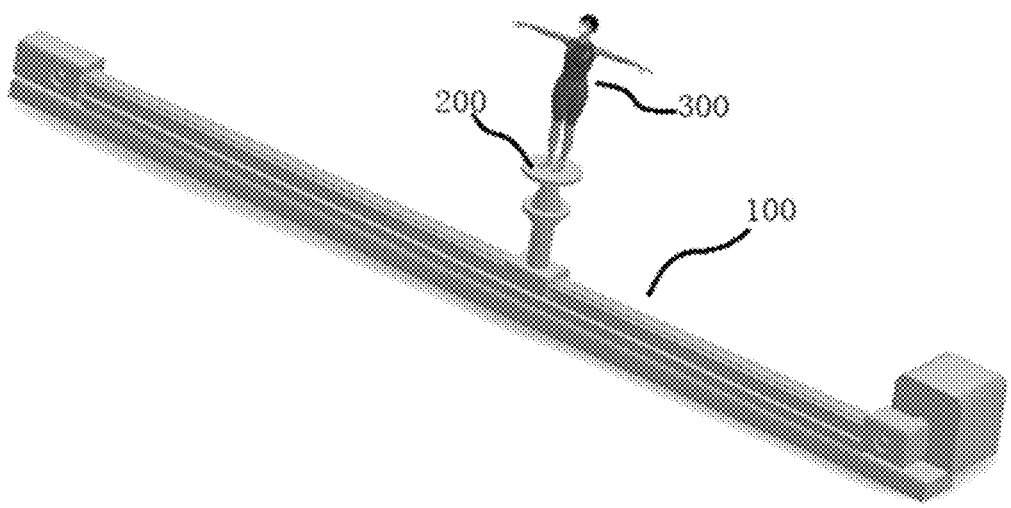
FIG. 2 is a schematic view of a mechanical structure of a single-rail moving rail used by the test system for testing the detection performance of a human body safety inspection system in an example of the present disclosure.
Figure 3:
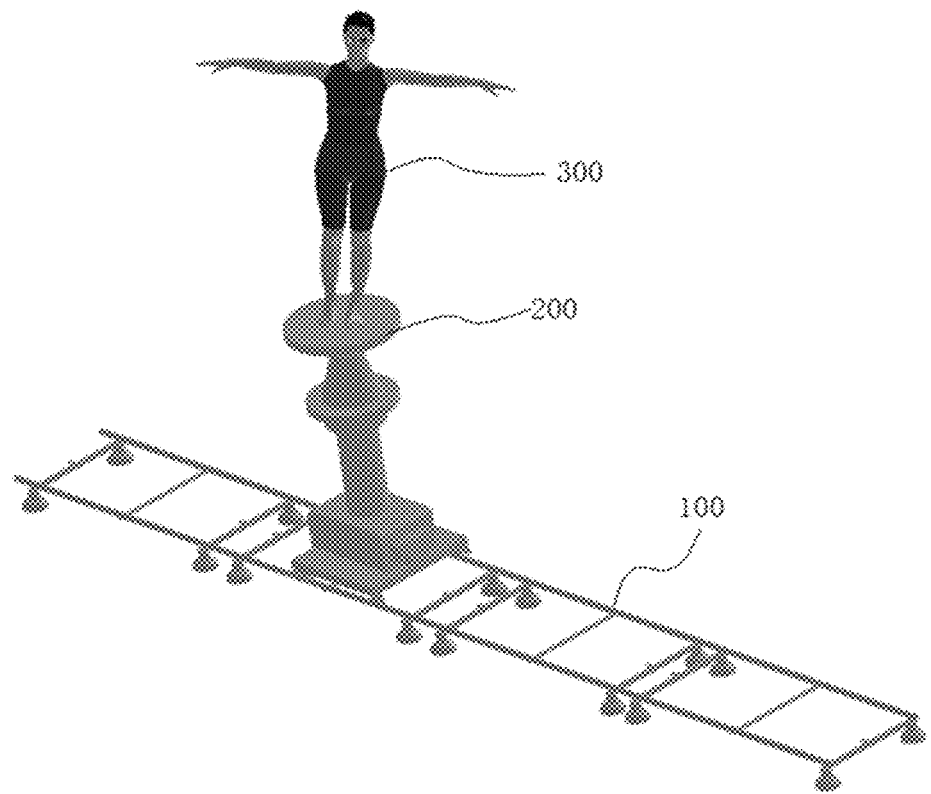
FIG. 3 is a schematic view of a mechanical structure of double-rail moving rails used by the test system for testing the detection performance of a human body safety inspection system in an example of the present disclosure.

With further reference to FIG. 2 and FIG. 3 which show embodiments of two mechanical structures of the test system for testing the detection performance of a human body safety inspection apparatus given in the present solution, one mechanical structure uses a single-rail moving rail, and the other mechanical structure uses double-rail moving rails.

As can be seen from the figure, the test system for testing the detection performance of a human body safety inspection apparatus provided by the present solution mainly includes a moving track assembly 100, a fixed tray assembly 200, a human body model assembly 300, a control assembly 400, a test card assembly 500 and a test article 600 by mutual cooperation;

the moving track assembly 100 in the system is used for constructing a number of different forms of movement routes for the detection of passage of a human body model in a predetermined movement mode by a human body safety inspection apparatus using regions or platforms under inspection in different shapes.

The human body model assembly 300 in the system is used for simulating a real human body under test, including the body shape, clothing and body temperature; the human body model assembly is mounted on the fixed tray assembly 200 and is capable of moving up and down or/and rotating under driving of the fixed tray assembly to simulate a real person in a detection state of the realistic application scenario.

The fixed tray assembly 200 in the system is movably mounted on the moving track assembly 100 and used for mounting and locking the human body model assembly 300. The fixed tray assembly 200 is capable of driving the locked human body model assembly 300 to perform a 360-degree rotation as well as raising the height of the human body model assembly 300.

The test card assembly 500 and the test article 600 in the system are used for testing the detection function and performance of the human body safety inspection apparatus, and may be additionally mounted in corresponding test regions on the human body model assembly 300.

The control assembly 400 in the system controls the moving track assembly 100, the fixed tray assembly 200 and the human body model assembly 300 and makes them to cooperate to work so as to form a test environment.

The control assembly 400 controls the heat generating state of the human body model assembly 300 to simulate a real human body temperature; the control assembly 400 controls the fixed tray assembly 200 to drive the human body model assembly 300 to move up and down and to perform the 360-degree rotation to face the human body safety inspection apparatus to be tested at different angles; the control assembly 400 also controls the moving track assembly 100 to drive the human body model assembly 300 to move back and forth repeatedly at a set speed to an appropriate position in a region under inspection.

Figure 4:
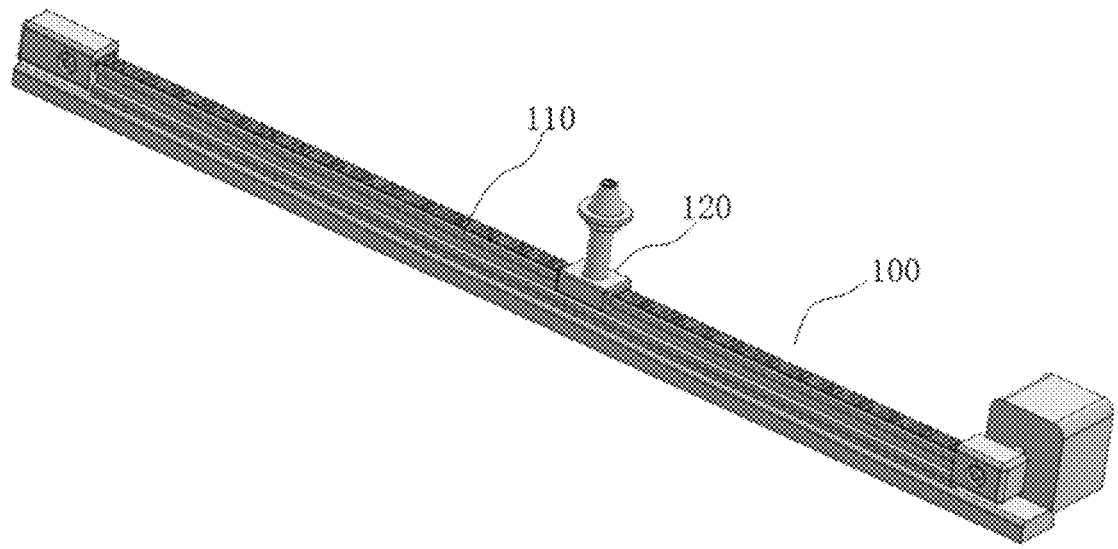
FIG. 4 is a schematic structural view of a single-rail moving rail unit of the test system in an example of the present disclosure.
Figure 5:
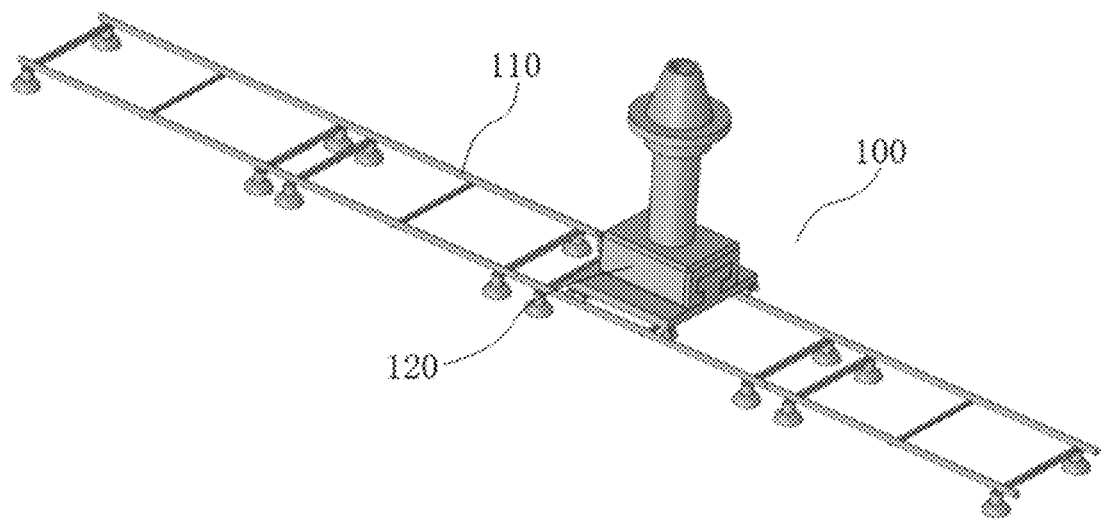
FIG. 5 is a schematic structural view of a double-rail moving rail unit of the test system in an example of the present disclosure.

In some embodiments of the present solution, with reference to FIG. 4 and FIG. 5, the moving track assembly 100 mainly includes two main parts: guide rail units 110 and a moving bearing device 120.

The guide rail unit 110 is used for constructing a number of different forms of movement routes for the detection of passage of a human body model in a predetermined movement mode by the human body safety inspection apparatus using regions or platforms under inspection in different shapes.

The moving bearing device 120 is movably mounted on the guide rail unit 110 and used for bearing the fixed tray assembly 200 and the human body model assembly 300 locked thereon. The moving bearing device 120 is controlled by the control assembly 400 and is able to be controlled by the control assembly 400 to move along the guide rail unit 110 in accordance with required parameters such as a set speed, number of times or distance.

In some embodiments, the moving bearing device 120 may be in wired or wireless connection with the control assembly 400 for achieving controlled connection.

In some embodiments, the moving bearing device 120 may include a corresponding moving table and a bracket disposed thereon. The moving table can be driven to move along the rail unit under driving of a corresponding drive component. The specific composition of the moving table can be determined according to the actual requirements and is not limited here.

As an alternative, the moving bearing device 120 may include a corresponding rail tackle and a bracket disposed thereon. The rail tackle is automatically powered and can be moved directly along the rail unit.

As an example, the rail tackle can include a motor pulley, a moving wheel combination and an anti-derailment positioner for free movement along a diverse combination of guide rails in complex application scenarios.

On this basis, a rechargeable battery can further be configured in the rail tackle to remotely and wirelessly control the rail tackle to move on its own. The implementation solutions according to this can be determined based on actual requirements and are not limited here.

Figure 6:
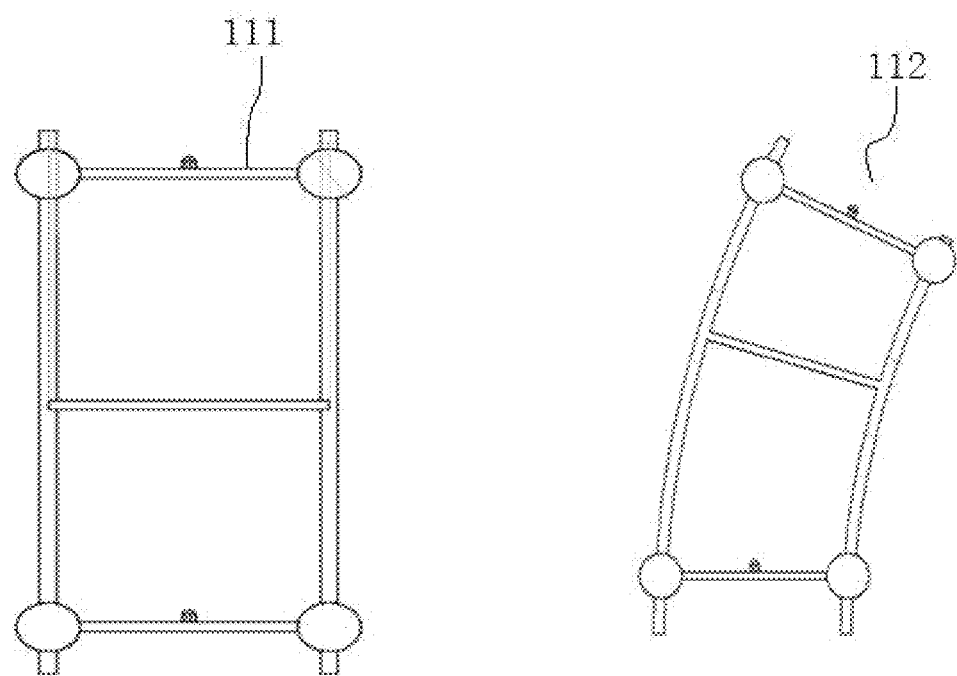
FIG. 6 is a structural schematic view of a curved guide rail and a straight guide rail of the test system in an example of the present disclosure.

In some embodiments, the guide rail unit 110 in the moving track assembly 100 preferably includes a plurality of moving guide rails. The moving guide rails here include curved guide rails 112 and straight guide rails 111, while both the curved guide rails 112 and the straight guide rails 111 can be divided into a single rail and double rails (as shown in FIG. 6).

The double rails here can be folded singly and can be locked and seamlessly spliced. As an example, through sleeve rods of the same size, interfaces in the front and rear ends of stainless steel rods of different curved guide rails 112 and straight guide rails 111 are selected for butt joint, a central soft material sleeved with a shell stainless steel hard material is used at the interface, and a high-strength composite soft material is used for designing left and right support points at a position of the butt joint, facilitating shock absorption and stability during the contact between the stainless steel hard material and a hard material (ground). At the same time, a middle fastener of a middle rod of the two guide rails is used for fixing after the butt joint.

As an example, the specification of the gauge of the corresponding double-rail rails is 600 mm by default and can be adjusted by a conventional stretchable stainless steel sleeve rod in a telescopic mode in the range of 500 mm to 900 mm, and the corresponding double-rail rails are used for being laid in a channel or on a platform under inspection of the human body safety inspection apparatus under test.

On this basis, for the specifications of the curved double rails, the central angle of bending is 25 degrees, the outer arc radius is 3000 mm, and the tube diameter is 36 mm. For the specifications of the straight double rails, the length is 1500 mm and the tube diameter is 36 mm.

In the case where the double-rail guide rails are used for forming the guide rail unit 110, the movement routes of the double-rail guide rails in any form can be freely combined by a combination of single folding and seamless splicing of the straight double rails and the curved double rails.

Figure 7:
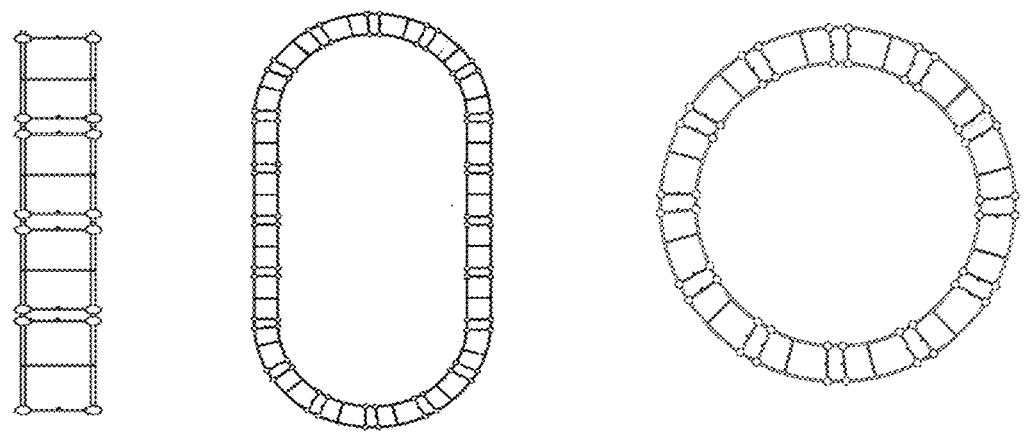
FIG. 7 is a schematic view of a layout of combined double-rail guide rails of the test system in an example of the present disclosure.

As an example, with reference to FIG. 7, the double-rail guide rails can be seamlessly connected and combined in various ways to achieve straight, sectorial, elliptical, circular and other guide rail movement routes formed by at least "4 straight rails and 7 curved rails", "8 straight rails and 14 curved rails", "14 curved rails" and other combinations for the detection of passage of a human body model in a predetermined movement mode by the human body safety inspection apparatus using regions or platforms under inspection in different shapes.

Figure 8:
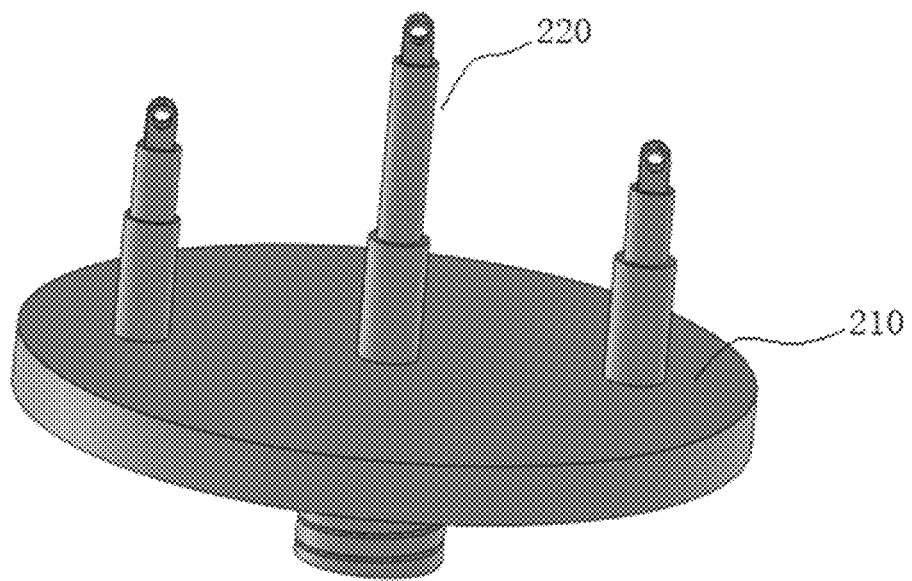
FIG. 8 is a structural schematic view of a fixed tray assembly of a human body model of the test system in an example of the present disclosure.
Figure 9:
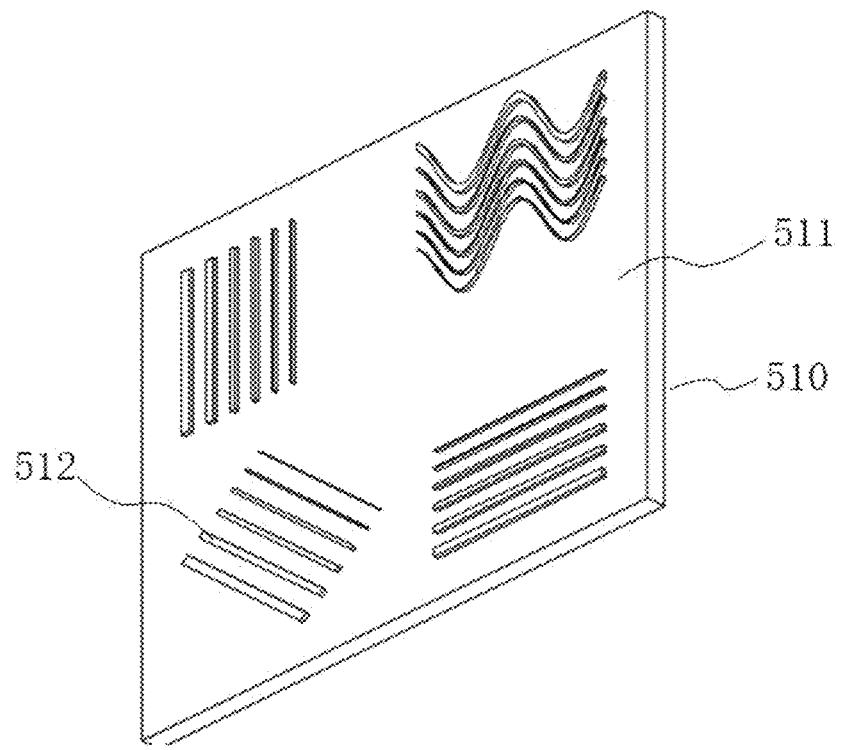
FIG. 9 is a three-dimensional top view of a line-to-line resolution test card of the test system in an example of the present disclosure.
Figure 10:
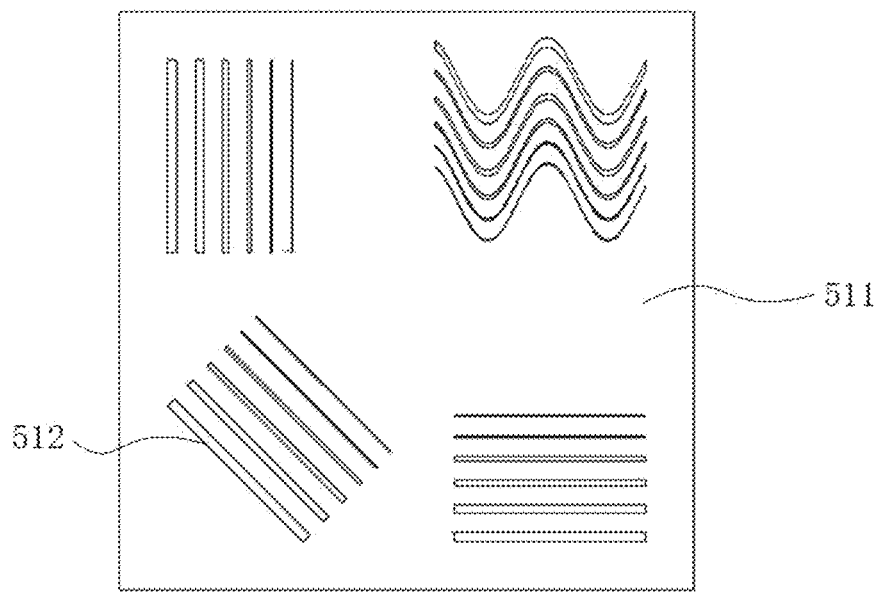
FIG. 10 is a schematic view of a layout of the line-to-line resolution test card of the test system in an example of the present disclosure.
Figure 11:
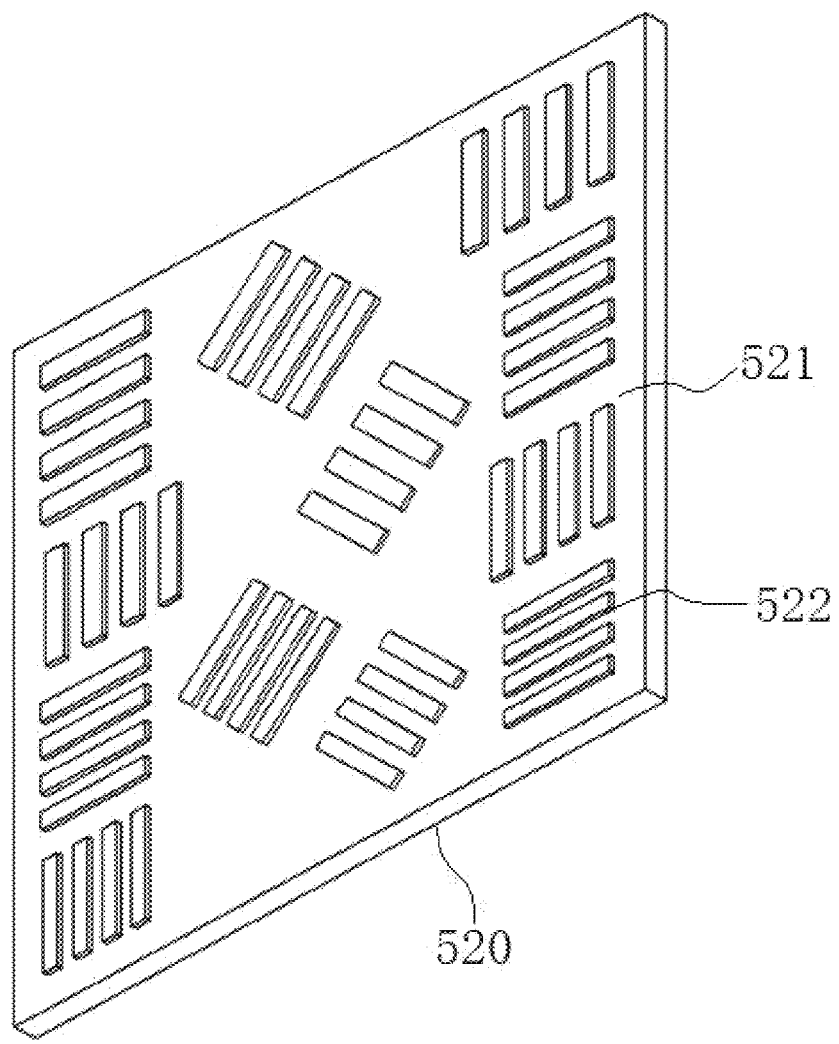
FIG. 11 is a three-dimensional top view of a space resolution test card of the test system in an example of the present disclosure.
Figure 12:
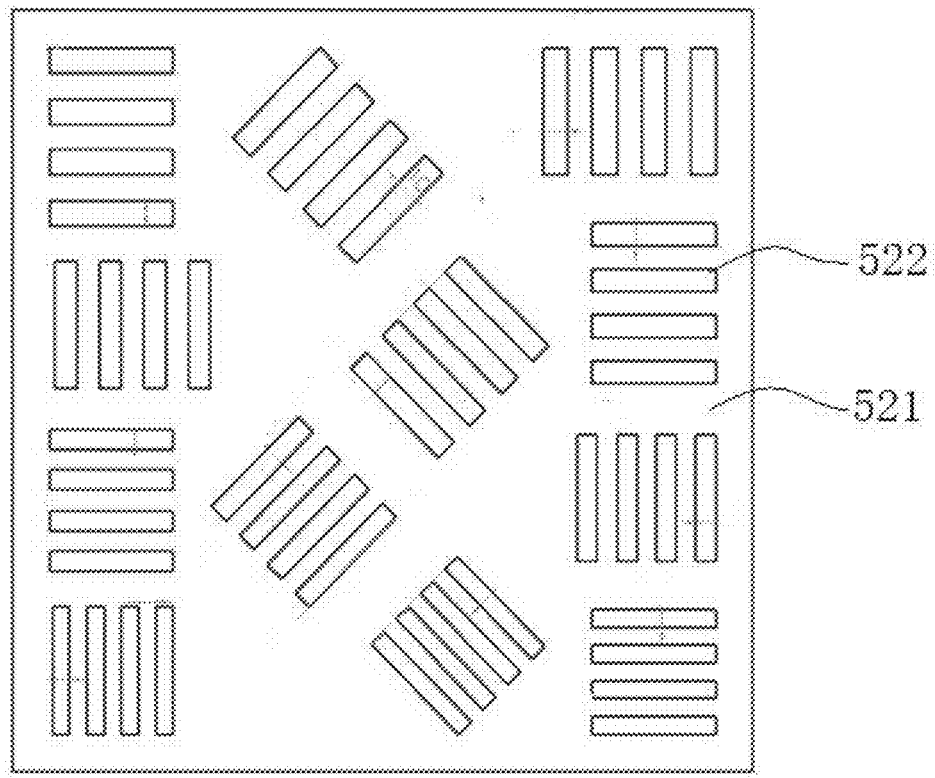
FIG. 12 is a schematic view of a layout of the space resolution test card of the test system in an example of the present disclosure.

In some examples of the present solution, in conjunction with what is shown in FIG. 8, the fixed tray assembly 200 in the system may include a tray portion 210 and a number of length-adjustable fixing brackets 220 in cooperation.

Here, the tray portion 210 is mounted on the moving track assembly 100, and with the composition of the moving track assembly 100 described above as an example, the tray portion 210 can be mounted on a bracket in the moving track assembly 100. At the same time, the tray portion 210 is controlled by the control assembly 400 and can perform a 360-degree rotation to realistically drive the human body model assembly 300 to rotate at any angle.

In conjunction with this, the number of length-adjustable fixing brackets 220 are mounted on the tray portion 210 to fix and lock the human body model assembly 300. At the same time, the length-adjustable fixing brackets 220 are controlled by the control assembly 400 and are adjustable in length to adjust the relative height of the human body model assembly 300.

In some embodiments, the tray portion 210 here may be formed by a cylinder in a diameter of 600 mm×a thickness of 50 mm, while the cylinder is made of an ABS resin material, and selected to be of an appropriate thickness to achieve interference with electromagnetic wave detection by metal bracket components of the rail tackle to avoid false alarms; where the selected material and thickness have a certain shielding effect on terahertz and millimeter wave bands to avoid that metal affects the detection range and detection results.

Further, the fixed tray and the rail pulley/moving table are connected through a circular rotating shaft, and the rotating shaft is controlled by software to rotate by 360 degrees, and moves and rotates by controlling the rotation angle by the software or according to a movement mode preset by the software, so as to simulate the action trajectory of a conventional human body moving according to the detection region or detection channel of the terahertz/millimeter wave apparatus.

On this basis, three length-adjustable fixing brackets 220 are disposed on the tray portion 210 formed by the cylinder. The three length-adjustable fixing brackets are locked in a three-point positioning mode, respectively used for fixing the two lower legs and the back of the human body model of different sizes without waggling caused by movement.

The specific configuration of the three length-adjustable fixing brackets can be determined according to actual needs, and will not be described in detail herein. The length adjusting range thereof can be set within 1-1000 mm.

In some examples of the present solution (in conjunction with FIGS. 1-3), the human body model assembly 300 in the system mainly includes a human body model prop 310 (i.e., a human body model), a body model 320, a test clothing 330 and a heat generating device 340 cooperating with each other.

Here, the human body model prop 310 specifically includes two types of a male model and a female model, and the specifications include a half-body model, a medium-long model and a whole-body model. The key positions of limbs are movable to change modeled shapes to simulate the adult with the age of 20-60 years and BMI of 18.5-24.0.

The surface of the human body model prop 310 is made of a high-density polyethylene (also called HDPE) material to form the body model, with a thickness of not less than 55 mm; a male human body model, a female human body model and a child human body model are set in equal proportions according to the conventional human body form; the internal structure of the model is of a hollow design, facilitating mounting the built-in heat generating device; and the torso of the model is movable and the surface is provided with fixing fasteners to facilitate putting on or taking off different styles of clothing.

Figure 14:
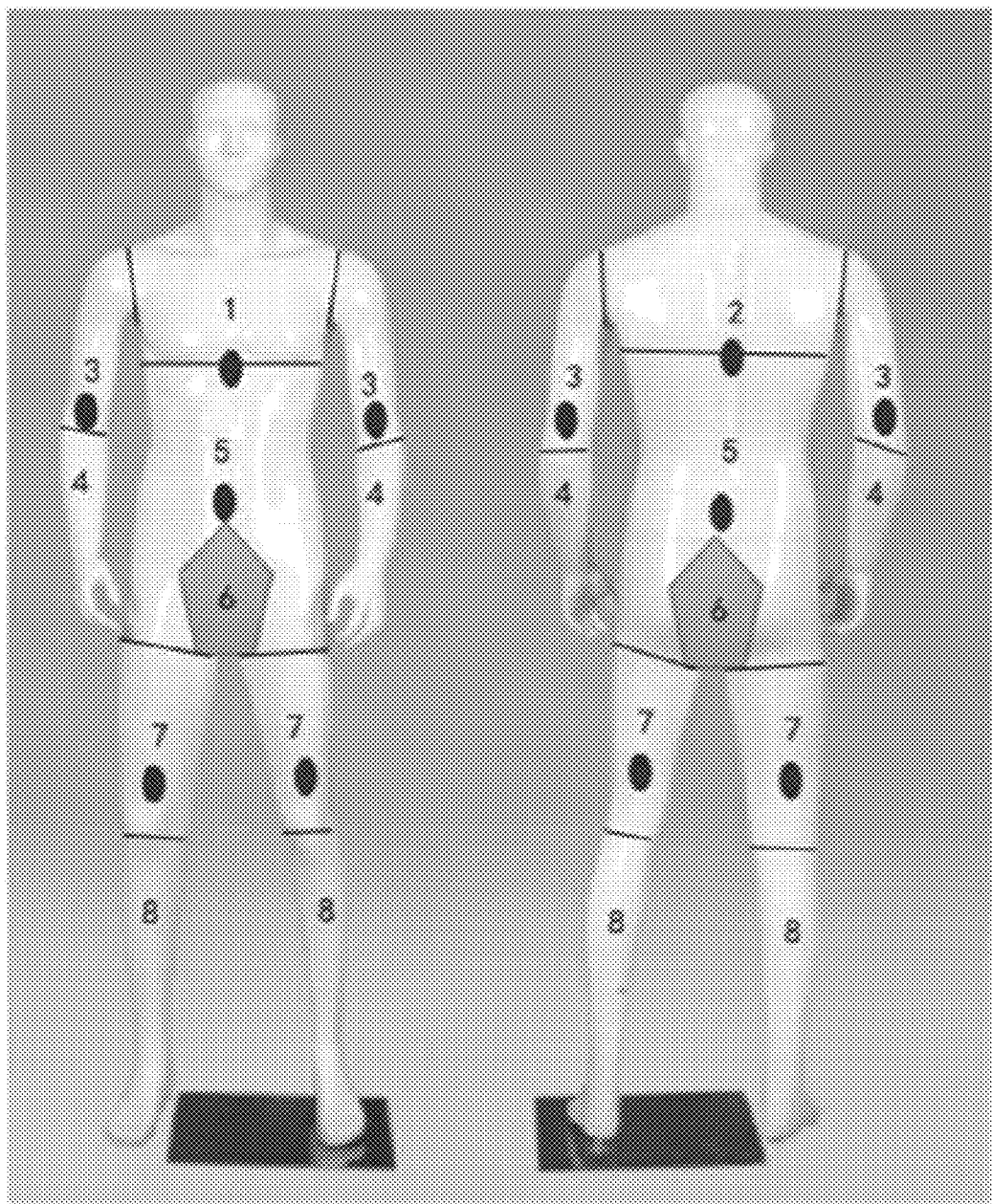
FIG. 14 is a schematic view of a layout of portions for installing a heat generating device and test regions of the test system in an example of the present disclosure.

With reference to FIG. 14, the human body model prop 310 (i.e., the human body model) formed in this way is respectively provided with corresponding test regions on the front chest (1), the upper back (2), the upper arms (3), the lower arms (4), the torso (5), the crotch (6), the thighs (7) and the lower legs (8) of the human body model.

Further, the test clothing 330 includes 2 to 3 kinds of test samples of typical fabric or padding having different styles and being easy to wear in the four seasons of spring, summer, autumn and winter, and is worn on the human body model to simulate the degree of penetration interference of the clothing with electromagnetic waves under real conditions. The fabric includes at least cotton cloth, linen, silk weaving, wool fabric and leather. The padding includes at least cotton, down and artificial fibers.

Further, the heat generating device 340 is additionally mounted on typical parts of the human body model associated with the test region and is controlled by the control assembly 400 so that the temperature of different parts of the human body model varies from 36° C. to 45° C., for simulating the temperature of different parts of the real human body and the variation with the surrounding environment and for meeting the relevant radiation intensity requirements for terahertz waves and millimeter waves. To ensure the safety, an alarm is given when the controlled temperature exceeds a threshold.

As an example, the heat generating device preferentially includes blackbody heating plates made of a wave-absorbing material and a heating device; the heating device is mounted as a control assembly in the hollow interior of the human body model, is connected with each blackbody heating plate to perform uniform heating to a set temperature, and displays the temperature in real time on each region sensor of the control software.

The heat generating device 340 formed in this way is additionally mounted in the test regions of the test clothing of the human body model respectively, and the test regions here are distributed on the front chest (1), the upper back (2), the upper arms (3), the lower arms (4), the torso (5), the crotch (6), the thighs (7) and the lower legs (8) of the human body model (as shown in FIG. 14). The heat generating device 340 thus distributed can effectively control the temperature of different parts on the human body model to vary within 36° C. to 45° C. under the control of the control assembly.

In some examples of the present solution (in combination with FIGS. 9-12), the test card assembly 500 in the system mainly includes a (body) line-to-line resolution test card, a (body) space resolution test card, an air background material detectability test card and a human body background material detectability test card, so as to be used for the performances of (body) resolution, (body) space resolution, air background material detectability, human body background material detectability, etc. of the human body safety inspection apparatus. The test cards are selected according to different technical principles used by the human body safety inspection apparatus, and the number of the test cards formed is set according to different specifications. The above different test card assemblies and the performance indexes of the human body safety inspection apparatus with different technologies are collectively named correspondingly, for example, the corresponding indexes of the human body safety inspection apparatus based on the microdose X-ray technology include a body line-to-line resolution, body space resolution, air background material detectability, and human body background material detectability, and the corresponding test card can be directly designed and used with the test body which complies with Annex B in the GB 15208.4-2018 standard; the corresponding indexes of the human body safety inspection apparatus based on the terahertz technology include a resolution, space resolution, detectable rate, false alarm rate and passing rate, and the corresponding test card can be designed according to this patent; the corresponding indexes of the human body safety inspection apparatus based on the millimeter wave holographic imaging technology include a resolution, space resolution, detectable rate, missing alarm rate, false alarm rate, redundant false alarm index, etc., and the corresponding test card can be designed according to this patent.

In some embodiments, the test card assembly 500 includes a line-to-line resolution test card 510 and a space resolution test card 520 for the human body safety inspection apparatus based on the millimeter wave technology.

The line-to-line resolution test card 510 in the test card assembly 500 has a specification size of 300 mm×300 mm with an acrylic plate of a 2 mm thickness as a substrate 511 and a single or line pair of metal strips 512 attached to the surface.

The space resolution test card 520 in the test card assembly 500 has a specification size of 300 mm×300 mm with an acrylic plate of a 2 mm thickness as a substrate 521 and a single or line pair of metal strips 522 attached to the surface.

As an example, during specific implementation, the specifications of the single metal strip used for the line-to-line resolution test card include a strip length of 50 mm and strip widths of 0.5 mm, 1 mm, 2 mm, 3 mm, 4 mm and 5 mm; the layout thereof is in a rectangle with sine curves arranged at equal intervals, located in the upper right region of the test card; the layout thereof is in rectangles with straight lines arranged at equal intervals in three directions of the transverse direction, the longitudinal direction and inclination at an angle of 45 degrees, located in the other three quadrant regions of the test card, with the rectangles equidistant from the corners. Thus, a set of test cards are used to evaluate the line-to-line resolution of a millimeter wave apparatus from different angular directions using distribution in the square region.

The specifications of the line pair of metal strips used for the space resolution test card include a strip length of 50 mm and strip widths of 10 mm, 9 mm, 8 mm, 7 mm, 6 mm, 5 mm, 4.5 mm, 4 mm, 3.5 mm, 3 mm, 2.5 mm, 2 mm, 1.5 mm and 1 mm; the layout thereof is in rectangles with 4 straight lines of each size arranged at equal line width and equal intervals in a total of three directions on the test card, the transverse direction, the longitudinal direction and inclination at an angle of 45 or 315 degrees, distributed at equal intervals. A total of 3 space test cards are formed. Thus, a set of test cards are used to evaluate the space resolution of the millimeter wave apparatus from different angular directions using distribution in the square region.

In some embodiments, the test card assembly 500 includes a line-to-line resolution test card 510 and a space resolution test card 520 for the human body safety inspection apparatus based on the terahertz technology.

The line-to-line resolution test card 510 in the test card assembly 500 has a specification size of 300 mm×300 mm with an acrylic plate of a 3 mm thickness as a substrate 511 and a single or line pair of metal strips 512 attached to the surface.

The space resolution test card 520 in the test card assembly 500 has a specification size of 300 mm×300 mm with an acrylic plate of a 3 mm thickness as a substrate 521 and a single or line pair of metal strips 522 attached to the surface.

As an example, during specific implementation, the specifications of the single metal strip used for the line-to-line resolution test card include a strip length of 100 mm and strip widths of 5 mm, 10 mm, 15 mm, 20 mm, 25 mm and 30 mm; Meanwhile, the layout solution of the human body safety inspection apparatus based on the millimeter wave technology is used, and the specific number is adjusted and selected according to the size. Thus, a set of test cards are used to evaluate the line-to-line resolution of the terahertz apparatus from different angular directions using distribution in the square region.

The specifications of the line pair of metal strips used for the space resolution test card include a strip length of 100 mm and strip widths of 50 mm, 45 mm, 35 mm, 25 mm and 20 mm. Meanwhile, the layout solution of the human body safety inspection apparatus based on the millimeter wave technology is used, and the specific number is adjusted and selected according to the size. Thus, a set of test cards are used to evaluate the space resolution of the terahertz apparatus from different angular directions using distribution in the square region.

In some embodiments, for the human body safety inspection apparatus based on the microdose X-ray technology, the test card assembly 500 includes an air background material detectability test card, a human body background material detectability test card, a body line-to-line resolution test card and a body space resolution test card, which are used for testing the performance of the air background material detectability, the human body background material detectability, the body line-to-line resolution and the body space resolution of the human body safety inspection apparatus based on the microdose X-ray.

The specifications and layout of the air background material detectability test card, the human body background material detectability test card, the body line-to-line resolution test card and the body space resolution test card can be selected by referring to Annex B in the national standard of GB 15208.4-2018 "Microdose X-ray Safety Inspection Apparatus-Part 4: "Human Body Safety Inspection Apparatus".

During the specific application of the test card thus formed, according to the different technical principles used by the human body safety inspection apparatus, the test card is selected and replaced according to the requirements for the performance indexes of the tested items, and can be fixed to the chest or back of the human body model.

In some examples of the present solution, the test article 600 in the system includes typically six metal or non-metal articles customized and selected according to the material and size of conventional contraband, and may be attached to the designated test regions of the human body model.

Figure 13:
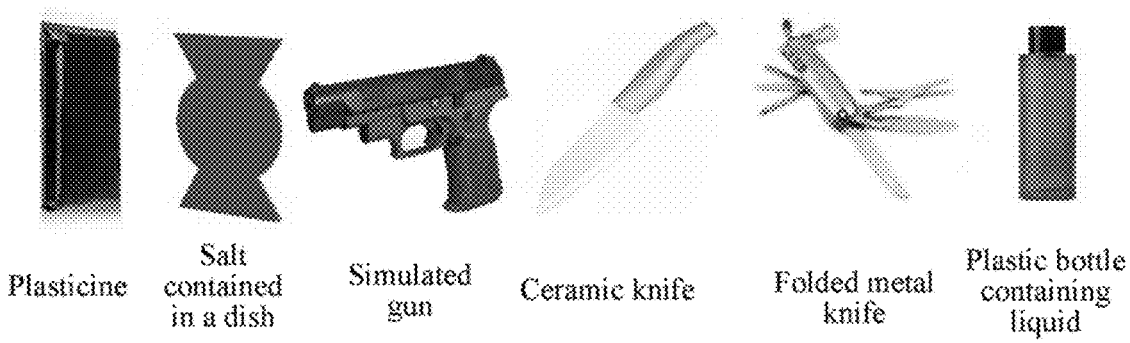
FIG. 13 is a schematic view of a test article of the test system in an example of the present disclosure.

As shown in FIG. 13, the test article herein specifically includes a rectangular non-metal article (plasticine) having a size of 150 mm×100 mm×5 mm, a butterfly-shaped non-metal article (salt) having a size of Φ120 mm×a thickness of 10 mm, an L-shaped profiled metal article (aluminum) having a size of 110 mm×70 mm×16 mm, a ceramic knife having a blade length of 70 mm, a metal folding knife having a blade length of 70 mm, and a liquid article in a plastic bottle of not less than 100 ml of water.

During specific application, such test articles can be attached to different parts of the human body model, such as the upper arms, the lower arms, the front chest, the back, the thighs, the lower legs, the torso side, the groins, the buttocks, the armpits and the underbody, used as the designated test regions of the apparatus to be tested, to be used for testing the performance such as the detectable rate, missing alarm rate, false alarm rate and redundant false alarm index of the human body safety inspection apparatus.

In some examples of this solution, the test assembly 400 in the system mainly includes two parts: an electronic control module 410 and a temperature control module 420.

The electronic control module 410 controls the moving track assembly 100 and the fixed tray assembly 200 so as to control the moving track assembly 100 to drive the human body model assembly to move back and forth, and then to adjust the state of the human body model assembly moving back and forth; the electronic control module 410 controls the fixed tray assembly 200 to drive the human body model assembly to rotate and adjust the height of the human body model assembly, and then controls and adjusts the rotation angle and height of the human body model assembly.

The temperature control module 420 controls the heat generating device in the human body model assembly 300 to control and adjust the temperature of different parts of the human body model to vary within a range of 36° C. to 45° C.

The specific composition of the test assembly 400 with the function can be determined according to the actual requirements and is not limited here. As an example, it can be a corresponding PLC, and can be a PC running temperature control software and/or electronic control software, a notebook and a PAD; and can also be a corresponding analog control circuit and the like.

As an example, the test assembly 400, when operating, controls the movement speed, movement direction and mode, movement trajectory, number of movements, etc. of the human body model assembly when driven to operate by the moving bearing device 120 in the moving track assembly 100 through the electronic control module 410. The movement speed should be within the range of no more than 20 km/h of the regular passing speed of the human body safety inspection apparatus for adults. Through the electronic control module 410, the fixed tray assembly 200 is controlled to drive the human body model assembly to rotate for 0 to 360 degrees and set the height as 1 to 1000 mm.

The test assembly 400, when operating, controls the heat generating device on the human body model through the temperature control module 420 to control the temperature of different parts of the human body model to vary within 36° C. to 45° C., for simulating the temperature of different parts of the real human body and the variation with the surrounding environment and for meeting the relevant radiation intensity requirements for terahertz waves and millimeter waves. An alarm is given when the controlled temperature exceeds a threshold.

The test system for testing the detection performance of a human body safety inspection apparatus formed in this way, when operating, controls the temperature of different parts on a human body model to vary within 36° C. to 45° C. to simulate the temperature of different parts of a real human body, while controlling the human body model carrying a test card and/or test article to rotate and adjust height so that the human body model rotates at different angles to face the human body safety inspection apparatus to be tested, and the human body model is driven to move back and forth repeatedly at a set speed to an appropriate position in a region under inspection to simulate a real person in a detection state in an actual application scenario, the human body model can be conveniently controlled so that it rotates by 360 degrees to face the human body safety inspection apparatus at different angles and can move back and forth repeatedly to an appropriate position in the region under inspection at a speed of up to 20 km/h to test automatic scanning imaging, contraband detection, (body) line-to-line resolution, (body) space resolution, human body background detectability and space background detectability, detectable rate, missing alarm rate, false alarm rate, redundant false alarm index, passing rate and other function and performance indexes, thus completing the automatic laboratory testing of the human body safety inspection apparatus.

The process for testing the detection performance of the human body safety inspection apparatus by the present test system is specified below in conjunction with the composition of the present test system.

Figure 15:
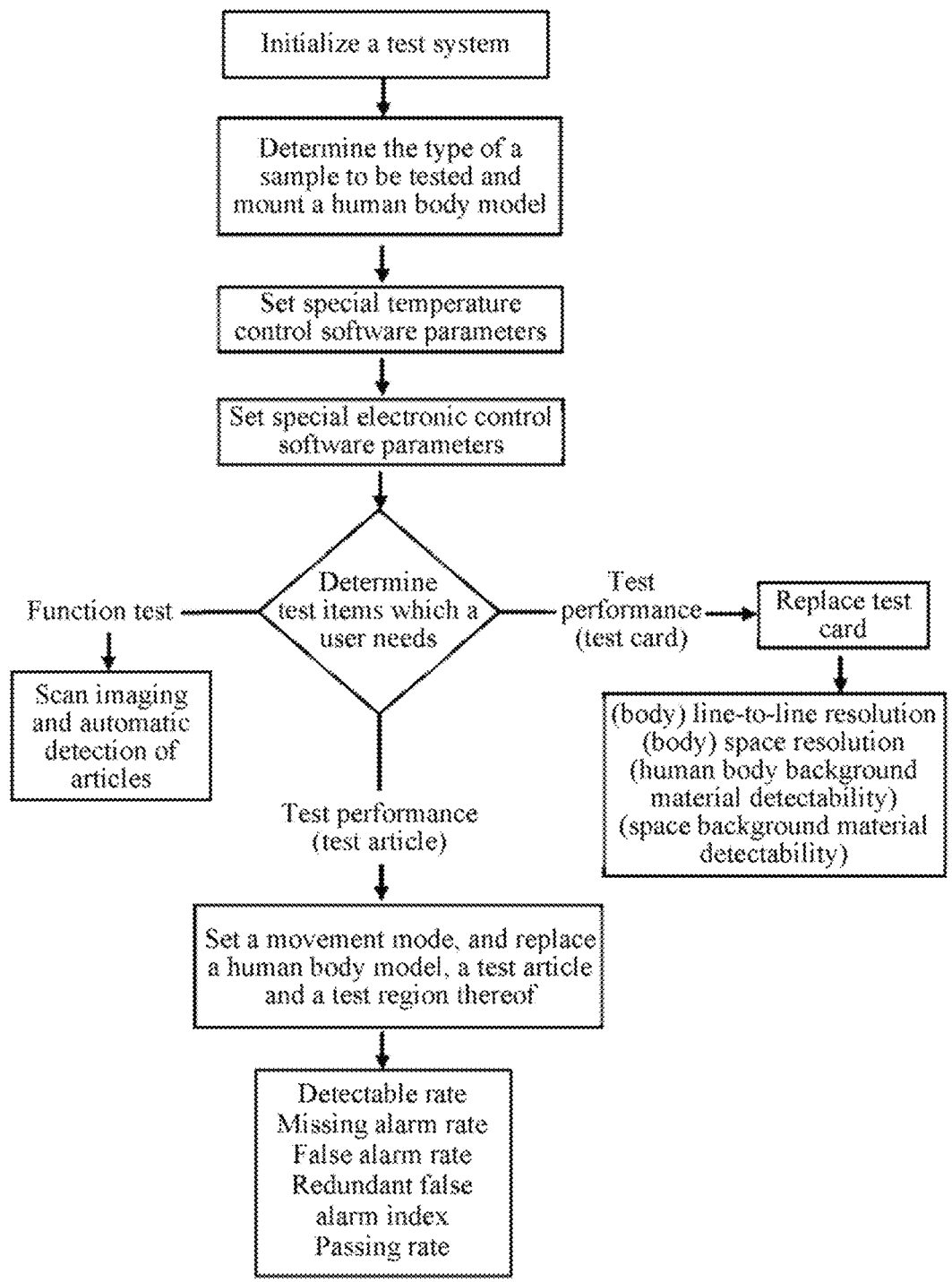
FIG. 15 is a flowchart of the test system for testing the detection performance of a human body safety inspection system in an example of the present disclosure.

With reference to FIG. 15, the process for testing the detection performance of the human body safety inspection apparatus based on the test system given in the present example specifically includes the following steps:

(1) initializing the test system according to user's operation;

(2) determining the type of technical principles used for a sample according to the product manual for the sample, i.e., the millimeter wave technology, the terahertz technology or the microdose X-ray technology; locking the human body model onto a fixed tray, then mounting the fixed tray on a bracket of a rail tackle/moving table, and adjusting the height and rotation angle of the human body model; and then laying guide rails in a region under inspection of the human body safety inspection apparatus to be tested, adjusting the overall width of moving rails according to the width of a passing channel, and placing the rail tackle/moving table on the guide rail;

(3) initializing the temperature of the human body model by a user by means of special temperature control software in conjunction with the application of the technology used for the apparatus under test, and setting the temperature of the various parts of the human body model according to the testing requirements;

(4) setting the movement speed, the number of movements and the movement mode of the human body model on the guide rail by the user according to the test requirement by means of the special electronic control software according to the test content of a test item;

(5) according to the function and performance index requirements under test, if it is a function test, proceeding to step (6); if it is a performance test using a test card, proceeding to step (7), and if it is a performance test using a test article, proceeding to step (8);

(6) performing function testing of scanning imaging and automatic detection of articles by the test system in accordance with the function technology requirements related to detection of the human body safety inspection apparatus; performing operation in accordance with the product's operation instruction to determine whether the apparatus meets the function technology requirements;

(7) according to the performance index requirements related to the human body safety inspection apparatus, using different test cards by the test system for testing (body) line-to-line resolution, (body) space resolution, human body background detectability, space background detectability and other performance indexes; and (8) according to the performance index requirements related to the human body safety inspection apparatus, testing, by the test system, the performance indexes of the detectable rate or passing rate, missing alarm rate, false alarm rate, and redundant false alarm index through operations such as setting the movement mode of the rail tackle by means of the special electronic control software, changing the human body model wearing different test clothing, changing the test article and the test region in which the test article is placed on the human body model.

In some preferred embodiment, the human body model here includes a human body model prop, a body model, a test clothing and a heat generating device. The human body model prop includes two types of a male model and a female model, and the specifications include a half-body model, a medium-long model and a whole-body model as shown in FIG. 2 and FIG. 3. The heat generating device includes heating plates heating a wave-absorbing material and special temperature control software, and is additionally mounted at different parts of the human body model, and the layout diagram thereof is as shown in FIG. 14.

In the test process for achieving the detection performance of the human body safety inspection apparatus based on the test system in the embodiment, operation regarding the special temperature control software in step (3) specifically includes the following steps:

(3.1) According to the human body surface temperature distribution, in combination with the radiation intensity needs of the test region, the user inputs the initial temperature value, change range and mode thereof through a special temperature control software interface according to the parts of the human body model on the layout diagram of the heat generating device as shown in FIG. 14, where the temperature should be in the range of 36° C. to 45° C. of the conventional human body surface temperature under the influence of the surrounding external environment.

(3.2) The heat generating device will receive a control signal from the special temperature control software and start to heat the corresponding part of the human body model.

(3.3) The temperature distribution of the human body model is displayed in real time on the interface of the special temperature control software. When the instantaneous temperature of a certain part exceeds a threshold, the interface will display an overheating hint.

In a preferred embodiment, the moving rail here includes a rail tackle/moving table, electronically controlled pulleys, a bracket, a rechargeable battery pack and guide rails, and the mechanical structure thereof is as shown in FIG. 4 or 5. The guide rail includes a single rail and double rails, where curved rails and straight rails can be freely combined to form double rails of any form whose layout diagram is as shown in FIG. 7.

Meanwhile, the fixed tray of the human body model and the structure thereof are as shown in FIG. 8. The fixed tray is mounted on the bracket of the moving rail and has stability that ensures that the moving human body model does not waggle on the guide rail. The special electronic control software controls the rotation angle and height of the human body model at the optimum detection position and also controls the directional movement thereof at a fixed speed in accordance with the trajectory of the guide rail.

In the test process for achieving the detection performance of the human body safety inspection apparatus based on the test system in the embodiment, operation regarding the special electronic control software in step (4) specifically includes the following steps:

(4.1) According to the test content of the test item, the user inputs movement parameters such as the movement speed, the movement direction and mode, the movement trajectory, the number of movements, etc. through a special electronic control software interface; the movement speed should be within the range of no more than 20 km/h of the regular passing speed of the human body safety inspection apparatus for adults.

(4.2) The moving table or rail tackle of the moving rail will make the human body model start to move on the guide rail when the control signal of the special electronic control software is received.

(4.3) The interface of the special electronic control software displays movement information such as the position of the human body model on the guide rail, the movement state, the number of movements, etc. in real time.

In a preferred embodiment, the structure of the test card here is as shown in FIGS. 9-12. The test card is mounted on the front or back of the human body model.

In the test process for achieving the detection performance of the human body safety inspection apparatus based on the test system in the embodiment, the test operation in step (7) for performance indexes related to the human body safety inspection apparatus specifically includes the following steps:

(7.1) According to the technical type of the human body safety inspection apparatus, the test card corresponding to the performance index is selected according to the test item, and the test card is mounted on the front or back of the human body model.

(7.2) For the human body safety inspection apparatus based on the millimeter wave technology, the requirement for the line-to-line resolution index thereof is less than or equal to 5 mm. Therefore, the line-to-line resolution test card is selected and mounted. The rotation angle and height of the human body model are controlled on the special electronic control software interface, the human body model is at a designated position in the region under inspection or on the platform, the apparatus is started and completes scanning, and an imaged pattern is visually inspected. The human body model wearing different test clothing and test cards at different positions are switched, the number of repeated tests reaches 100, the minimum line pair width of the scanned image that can be clearly distinguished is evaluated under a detectable rate of 100%, and whether the apparatus meets the performance index requirement is determined.

(7.3) For the human body safety inspection apparatus based on the millimeter wave technology, the requirement for the space resolution index thereof is less than or equal to 10 mm. Therefore, the space resolution test card is selected and the test method in (7.2) is repeated to determine whether the apparatus meets the requirement of the performance index.

(7.4) For the human body safety inspection apparatus based on the terahertz technology, the requirement for the line-to-line resolution index thereof is less than or equal to 30 mm. Therefore, the line-to-line resolution test card is selected and mounted. The test method in (7.2) is repeated to determine whether the apparatus meets the requirement of the performance index.

(7.5) For the human body safety inspection apparatus based on the terahertz technology, the requirement for the space resolution index thereof is less than or equal to 50 mm. Therefore, the space resolution test card is selected and mounted and the test method in (7.2) is repeated to determine whether the apparatus meets the requirement of the performance index.

(7.6) For the human body safety inspection apparatus based on the microdose X-ray technology, the requirement for the body line-to-line resolution index thereof is to be able to distinguish a single solid copper wire coil with the smallest wire diameter of 0.511 mm. Therefore, the body line-to-line resolution test card is selected and mounted and the test method in (7.2) is repeated to determine whether the apparatus meets the requirement of the performance index.

(7.7) For the human body safety inspection apparatus based on the microdose X-ray technology, the requirement for the body space resolution index thereof is to be able to distinguish a steel ball with the smallest diameter of 6 mm. Therefore, the body space resolution test card is selected and mounted and the test method in (7.2) is repeated to determine whether the apparatus meets the requirement of the performance index.

(7.8) For the human body safety inspection apparatus based on the microdose X-ray technology, the requirement for the human body background material detectability index thereof is to be able to distinguish a disc of a smallest thickness of 5 mm. Therefore, the human body background material detectability test card is selected and mounted and the test method in (7.2) is repeated to determine whether the apparatus meets the requirement of the performance index.

(7.9) For the human body safety inspection apparatus based on the microdose X-ray technology, the requirement for the air background material detectability index thereof is to be able to distinguish a HDPE sawtooth of a smallest thickness of 3 mm; the smallest thickness of stainless steel (SST-304) sawteeth that can be distinguished is 1.6 mm. Therefore, the air background material detectability test card is selected and mounted and the test method in (7.2) is repeated to determine whether the apparatus meets the requirement of the performance index.

In a preferred embodiment, the design solution of the test article is as shown in FIG. 13. The test article is mounted on the human body model and the mounting layout thereof corresponding to the test region is as shown in FIG. 14.

In the test process for achieving the detection performance of the human body safety inspection apparatus based on the test system in the embodiment, depending on the different technical principle used for the apparatus under test, the test operation of the performance index related to the human body safety inspection apparatus in step (8) specifically includes the following steps:

(8.1) According to the product instruction manual, the prepared test clothing is worn on the human body model, and the human body model is detected without a false alarm. Six kinds of test articles (numbered k, k=1, 2, 3, , , , 6) are respectively placed in sequence in the eight test regions of the human body model to be tested (numbered l, l=1, 2, 3, , , , 8) according to FIG. 5. The two human body models with and without the test article are placed in a front-back crossed sequence, and move independently.

(8.2) The movement speed is set on the special electronic control software interface, the movement mode for moving back and forth and the movement trajectory are set, and the number of tests per round is set as n and the test starts. The test is repeated at least 10 times (n≥10).

(8.3) The male and female human body models with 2 typically different test clothing in the four seasons are respectively replaced in turn. The detected human body models are numbered according to the gender and the seasonal clothing, those with test items attached being numbered as odd numbers i (i=1, 3, , , , 7); and those without test articles being numbered as even numbers j (j=2, 4, , , , 8).

(8.4) At the end of each round of testing, according to detection for a human body model with the number i in a test region 1 thereof, the number of detected alarms of the corresponding test article k is recorded as $D_{ikl}$, the number of false alarms is recorded as $F_{ikl}$, the number of false alarms in other test regions in the same test is recorded as $R_i$, the total number of detections for the test articles is recorded as 384*n, and the total number of detections for the test region without the test articles is recorded as 384*n. According to detection for a human body model with the number j in a test region l thereof, the number of false alarms is recorded as $F_{jl}$, and the cumulative number of alarms in the test region is $R_j$.

(8.5) For the human body safety inspection apparatus based on the millimeter wave technology, the requirement for the detectable rate index thereof is that the detectable rate of the apparatus with an automatic detection function of articles should be greater than or equal to 85%. Therefore, calculation is performed according to Formula (1) after the test to determine whether the apparatus meets the requirement of the performance index.

$$= \frac{\sum}{*} \times 100\% \qquad (1)$$

(8.6) For the human body safety inspection apparatus based on the millimeter wave technology, the requirement for the missing alarm rate index thereof is that the missing alarm rate of the apparatus with an automatic detection function of articles should be smaller than or equal to 15%. Therefore, calculation is performed according to Formula (2) after the test to determine whether the apparatus meets the requirement of the performance index.

$$= (1-) \times 100\% \qquad (2)$$

(8.5) For the human body safety inspection apparatus based on the millimeter wave technology, the requirement for the false alarm rate index thereof is that the false alarm rate of the apparatus with an automatic detection function of articles should be smaller than or equal to 15%. Therefore, calculation is performed according to Formula (3) after the test to determine whether the apparatus meets the requirement of the performance index.

$$= \frac{\sum 0}{**} \times 100\% \qquad (3)$$

(8.6) For the human body safety inspection apparatus based on the millimeter wave technology, the requirement for the redundant false alarm index thereof is that the redundant false alarm index of the apparatus with an automatic detection function of articles should be smaller than or equal to 30%. Therefore, calculation is performed according to Formula (4) after the test to determine whether the apparatus meets the requirement of the performance index.

$$= \frac{\sum 0}{**} \times 100\% \qquad (4)$$

(8.7) For the human body safety inspection apparatus based on the terahertz technology, the requirement for the detectable rate index thereof is that the detectable rate of the apparatus should be greater than or equal to 85%; according to the requirement for the missing alarm rate index, the missing alarm rate of the apparatus should be less than or equal to 25%. Therefore, the test of (8.1) to (8.5) is repeated, and according to the calculation results thereof, whether the apparatus meets the corresponding performance index requirements is determined respectively.

(8.8) For the human body safety inspection apparatus based on the terahertz technology, the requirement for the passing rate index thereof is that the passing rate is respectively greater than 200 persons/hour, 500 persons/hour and 1200 persons/hour according to categories A, B and C respectively. Thus, the test of (8.1) to (8.3) is repeated, after each round of testing ends, the time for single passing is recorded by checking the test time of the special electronic control software to calculate the single average passing time and derive the passing rate to determine whether the apparatus meets the requirement of the performance index.

(8.8) For the human body safety inspection apparatus based on the microdose X-ray technology, if the indexes of the detectable rate, missing alarm rate, false alarm rate and redundant false alarm index thereof are in accordance with the specific performance index requirement proposed for the product, then the test of (8.1) to (8.6) can be repeated, and whether the apparatus meets the requirement of the corresponding performance index is determined according to the calculation results thereof respectively.

As can be seen from the above example solution, the solution provided by the present disclosure makes the human body model with different rotation angles simulate the real person entering the inspection work state of the human body safety inspection apparatus according to the cross-testing situation with or without carrying the test article and the test card by a moving rail, which realizes the automatic laboratory detection of the human body safety inspection apparatus, thus greatly reducing the labor cost, with high controllability of test parameter conditions and high repeatability, and by diverse combinations of test methods, the number of tests is greatly increased and the data accuracy is effectively improved, thus effectively increasing the testing efficiency.

The foregoing has shown and described the basic principles, principal features, and advantages of the present disclosure. It should be understood by those skilled in the art that the present disclosure is not limited to the embodiments described above, merely the principles of the present disclosure are described in the above embodiment and description, various changes and improvements may be made therein without departing from the spirit and scope of the present disclosure, and the changes and improvements fall within the claimed scope of the present disclosure. The claimed scope of the present disclosure is defined by the claims appended hereto and their equivalents.

What is claimed is:

1. A test system for testing the detection performance of a human body safety inspection apparatus, comprising:
a moving track assembly, a fixed tray assembly, a human body model assembly, a control assembly, a test card assembly and a test article;
the human body model assembly being used for simulating a real human body under test, including the body shape, clothing and body temperature; the human body model assembly being mounted on the fixed tray assembly and being capable of moving up and down or/and rotating under driving of the fixed tray assembly to simulate a real person in a detection state of a realistic application scenario; the fixed tray assembly being movably mounted on the moving track assembly;
the test card assembly and the test article being used for testing a detection function and performance of the human body safety inspection apparatus, and able to be additionally mounted in test regions on the human body model assembly;
the control assembly controlling the moving track assembly, the fixed tray assembly and the human body model assembly to form a test environment; the control assembly controlling the heat generating state of the human body model assembly to simulate a real human body temperature; the control assembly controlling the fixed tray assembly to drive the human body model assembly to move up and down and to perform a 360-degree rotation to face the human body safety inspection apparatus to be tested at different angles; the control assembly controlling the moving track assembly to drive the human body model assembly to move back and forth repeatedly at a set speed to an appropriate position in a region under inspection.

2. The test system according to claim 1, wherein the moving track assembly mainly comprises a guide rail unit and a moving bearing device, the guide rail unit constructing a moving path, and the moving bearing device being used for bearing the fixed tray assembly, mounted on the guide rail unit, and controlled by the control assembly to move along the guide rail unit.

3. The test system according to claim 2, wherein the guide rail unit comprises a curved guide rail or/and a straight guide rail, the curved guide rail comprising a monorail structure or/and a double-rail structure, and the straight guide rail comprising a monorail structure or/and a double-rail structure.

4. The test system according to claim 1, wherein the fixed tray assembly comprises a tray portion and a plurality of length-adjustable fixing brackets, the tray portion being mounted on the moving track assembly and controlled by the control assembly to perform a 360-degree rotation; the plurality of length-adjustable fixing brackets being mounted on the tray portion for being fixedly connected to the human body model assembly, and the plurality of length-adjustable fixing brackets being controlled by the control assembly for length adjustment.

5. The test system according to claim 4, wherein the tray portion is made of an ABS resin material, the selected material cooperating with a thickness, shielding terahertz and millimeter wave bands.

6. The test system according to claim 1, wherein the human body model assembly comprises a human body model prop, a body model, a test clothing and a heat generating device;
the human body model is simulated into an adult human body shape, and the body model is made of a conventional high-density polyethylene material with a thickness of not less than 55 mm; a male human body model, a female human body model and a child human body model are set in equal proportions according to the conventional human body form; the internal structure of the model is of a hollow design, facilitating mounting the built-in heat generating device; the torso of the model is movable and the surface is provided with fixing fasteners to facilitate putting on or taking off different styles of clothing;
the test clothing is worn on the human body model for simulating the degree of penetration interference of the clothing with electromagnetic waves under real conditions; and
the heat generating device is additionally mounted on typical parts of the human body model associated with the test region and is controlled by the control. assembly so that the temperature of different parts of the human body model varies from 36° C. to 45° C., for simulating the temperature of different parts of the real human body and the variation with the surrounding environment and for meeting the relevant radiation intensity requirements for terahertz waves and millimeter waves.

7. The test system according to claim 6, wherein the heat generating device comprises a heating plate made of a wave-absorbing material.

8. The test system according to claim 1, wherein the control assembly comprises an electronic control module and a temperature control module, the electronic control module controlling the moving track assembly and the fixed tray assembly to control and adjust the state of the human body model assembly moving back and forth, and to control and adjust the rotation angle and height of the human body model assembly; the temperature control module controls the human body model assembly to control and adjust the temperature of different parts of the human body model to vary within a range of 36° C. to 45° C.

9. The test system according to claim 1, wherein further, the test card assembly comprises one or more of a (body) line-to-line resolution test card, a (body) space resolution test card, an air background material detectability test card, and a human body background material detectability test card.

10. The test system according to claim 9, wherein for a human body safety inspection apparatus based on the millimeter wave technology,
the corresponding line-to-line resolution test card and space resolution test card both have a specification size of 300 mm×300 mm with an acrylic plate of a 2 mm thickness as a substrate and a single or line pair of metal strips attached to the surface;
the specifications of the single metal strip used for the line-to-line resolution test card comprise a strip length of 50 mm and strip widths of 0.5 mm, 1 mm, 2 mm, 3 mm, 4 mm and 5 mm; the layout thereof is in a rectangle with sine curves arranged at equal intervals, located in the upper right region of the test card; the layout thereof is in rectangles with straight lines arranged at equal intervals in three directions of the transverse direction, the longitudinal direction and inclination at an angle of 45 degrees, located in the other three regions of the test card, with the rectangles equidistant from the corners;
the specifications of the line pair of metal strips used for the space resolution test card comprise a strip length of 50 mm and strip widths of 10 mm, 9 mm, 8 mm, 7 mm, 6 mm, 5 mm, 4.5 mm, 4 mm, 3.5 mm, 3 mm, 2.5 mm, 2 mm, 1.5 mm and 1 mm; the layout thereof is in rectangles with 4 straight lines of each size arranged at equal line width and equal intervals in a total of three directions on the test card, the transverse direction, the longitudinal direction and inclination at an angle of 45 or 315 degrees, distributed at equal intervals.

11. The test system according to claim 9, wherein for a human body safety inspection apparatus based on the terahertz technology, the corresponding line-to-line resolution test card and space resolution test card both have a specification size of 300 mm×300 mm with an acrylic plate of a 3 mm thickness as a substrate and a single or line pair of metal strips attached to the surface;
the specifications of the single metal strip used for the line-to-line resolution test card comprise a strip length of 100 mm and strip widths of 5 mm, 10 mm, 15 mm, 20 mm, 25 mm and 30 mm; the layout thereof is in a rectangle with sine curves arranged at equal intervals, located in the upper right region of the test card; the layout thereof is in rectangles with straight lines arranged at equal intervals in three directions of the transverse direction, the longitudinal direction and inclination at an angle of 45 degrees, located in the other three regions of the test card, with the rectangles equidistant from the corners;

the specifications of the line pair of metal strips used for the space resolution test card comprise a strip length of 100 mm and strip widths of 50 mm, 45 mm, 35 mm, 25 mm and 20 mm; the layout thereof is in rectangles with 4 straight lines of each size arranged at equal line width and equal intervals in a total of three directions on the test card, the transverse direction, the longitudinal direction and inclination at an angle of 45 or 315 degrees, distributed at equal intervals.

12. The test system according to claim 9, wherein for a human body safety inspection apparatus based on the microdose X-ray technology, the corresponding test cards comprise a body line-to-line resolution test card, a body space resolution test card, an air background material detectability test card and a human body background material detectability test card, wherein the specification and layout of the test card are set according to standards.

13. The test system according to claim 1, wherein the test article is selected to be set in the corresponding test region on the human body model according to the test needs and can be attached to different parts of the human body model such as the upper arms, the forearms, the forebreast, the back, the thighs, the lower legs, the torso side, the groins, the buttocks, the armpits and the underbody for testing the performance of the human body safety inspection apparatus in terms of the detectable rate or passing rate, missing alarm rate, false alarm rate and redundant false alarm index.

14. A test method for testing the detection performance of a human body safety inspection apparatus, wherein the test method controls the temperature of different parts on a human body model to vary within 36° C. to 45° C. to simulate the temperature of different parts of a real human body, while controlling the human body model carrying a test card and/or test article to rotate and adjust height so that the human body model rotates at different angles to face the human body safety inspection apparatus to be tested, and the human body model is driven to move back and forth repeatedly at a set speed to an appropriate position in a region under inspection to simulate a real person in a detection state in an actual application scenario, thus matching the inspection work state of the human body safety inspection apparatus and completing the automatic laboratory testing of the human body safety inspection apparatus.

15. The test method according to claim 14, wherein the test method comprises the following steps:
(1) initializing the test system according to user's operation;
(2) determining the type of technical principles used for a sample according to the product instruction manual for the sample, locking the human body model onto a fixed tray, then mounting a fixed tray assembly on a moving bearing device in a moving track assembly, and adjusting the height and rotation angle of the human body model; then laying guide rails in a region under inspection of the human body safety inspection apparatus to be tested, adjusting the overall width of moving rails according to the width of a passing channel, and placing the moving bearing device on the guide rail;
(3) initializing the temperature of the human body model by means of a control accessory in conjunction with the application of the technology used for the apparatus under test, and setting the temperature of the various parts of the human body model according to the testing requirements;
(4) setting the movement speed, the number of movements and the movement mode of the human body model on the guide rail according to the test requirement by means of the control accessory according to the test content of a test item;
(5) according to the function and performance index requirements under test, if it is a function test, proceeding to step (6); if it is a performance test using a test card, proceeding to step (7), and if it is a performance test using a test article, proceeding to step (8);
(6) performing function testing of scanning imaging and automatic detection of articles in accordance with the function technology requirements related to detection of the human body safety inspection apparatus; performing operation in accordance with the product's operation instruction to determine whether the apparatus meets the function technology requirements;
(7) according to the performance index requirements related to the human body safety inspection apparatus, using different test cards for testing (body) line-to-line resolution, (body) space resolution, human body background detectability, space background detectability and other performance indexes; and
(8) according to the performance index requirements related to the human body safety inspection apparatus, testing the performance indexes of the detectable rate, missing alarm rate, false alarm rate, redundant false alarm index and passing rate through operations such as setting the movement mode of a rail tackle by the control assembly, changing the human body model wearing different test clothing, changing the test article and the test region in which the test article is placed on the human body model.

* * * * *